Figure 1:
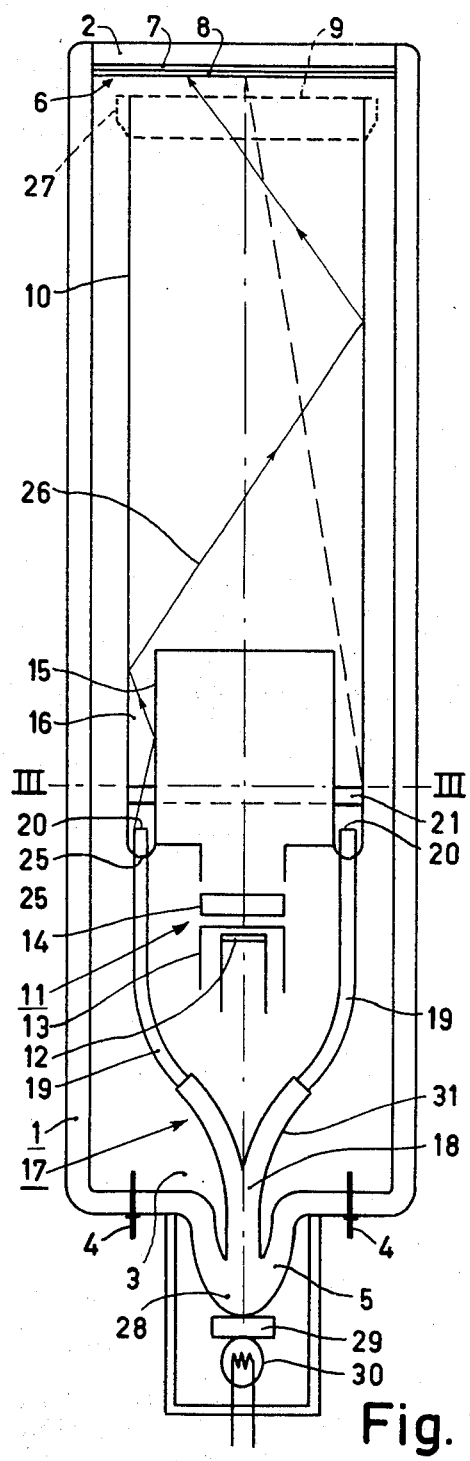

United States Patent [19]
Limper

[11] 3,978,365
[45] Aug. 31, 1976

[54] TELEVISION CAMERA TUBE
[75] Inventor: Nicolaas Hendrik Limper, Eindhoven, Netherlands
[73] Assignee: U.S. Philips Corporation, New York, N.Y.
[22] Filed: Apr. 8, 1975
[21] Appl. No.: 566,535

[30] Foreign Application Priority Data
Apr. 8, 1974  Netherlands............ 7404731

[52] U.S. Cl................. 313/372; 313/384
[51] Int. Cl.² ............ H01J 31/38; H01J 31/26
[58] Field of Search ......... 313/371, 384, 477, 365, 313/372

[56] References Cited
UNITED STATES PATENTS
3,267,209  8/1966  Nagamori et al............. 313/475 X
3,751,703  8/1973  Weijland et al............. 313/384 X
3,892,994  7/1975  Scholz.............................. 313/371

FOREIGN PATENTS OR APPLICATIONS
1,299,288  12/1972  United Kingdom............ 313/371

Primary Examiner—Robert Segal
Attorney, Agent, or Firm—Frank R. Trifari; Carl P. Steinhauser

[57] ABSTRACT

A television camera tube is provided with means for background illumination including a light distributor which is accommodated in a space between the anode sleeve and an auxiliary light shielding cylinder which coaxially projects into the anode sleeve and which extends beyond the light distributor so far that the central portion of the target is in a half-shadow.

12 Claims, 3 Drawing Figures

U.S. Patent  Aug. 31, 1976  3,978,365

TELEVISION CAMERA TUBE

The invention relates to a television camera tube, comprising a photo-sensitive target and an auxiliary illumination device comprising a light source and a light conductor for conducting the auxiliary illumination light into an anode sleeve of the camera tube.

A television camera tube of this kind is known, for example, from U.S. Pat. No. 3,628,076 dated Dec. 14, 1971 and issued to W. Weijland et al. Therein, a camera tube is described in which a light source is provided in the base of the camera tube and in which one or more light conductors conduct light from the light source into a cylindrical output anode sleeve of the camera tube. By making the inner wall of this anode sleeve reflective, preferably diffusely reflective, the target is more or less uniformly illuminated. Considering the ever increasingly requirements imposed as regards the uniformity of the television signal over the entire surface of the target, this solution is not alway adequate.

British Patent Specification 1,299,288 describes a camera tube which has for its object to improve the homogeneity in the auxiliary illumination of the target by introducing the auxiliary light into the anode sleeve via a series of ducts which are uniformly distributed over the circumference of the tube. The choice of the illumination distribution over the target, however, is also restricted therein. This is inter alia due to the fact that a central portion of the target has a higher sensitivity than portions which are situated nearer to the edge. Therefore, it may be desirable to make the intensity distribution homogeneous, and to compensate for the higher sensitivity of the central portion with respect to the edge portions by making the auxiliary illumination of the central portion, smaller.

To this end, the invention has for its object to provide a television camera tube in which an adjustable auxiliary illumination is imparted to the target, with the result that a television signal derived from the target, generated by the auxiliary illumination, is uniform over the entire target within narrow limits. To this end, a television camera tube of the kind set forth according to the invention is characterized in that a side of the light conductor which is remote from the light source is directed towards a light distributor which is included in a space between the anode sleeve and a hollow auxiliary cylinder which is coaxially mounted in the anode sleeve and which extends beyond the light distributor in the direction of the target.

In a camera tube according to the invention, an extremely homogeneous target illumination as well as a target illumination with an adjustable non-uniform intensity distribution can be realized by adaption of the length and the finishing of the auxiliary cylinder and possibly by adaptation of the light distributor. The inhomogeneity of the sensitivity of the target can thus be compensated for in a simple way by variation of the auxiliary cylinder facing the target or by providing openings in the cylinder wall thereof, to illuminate given parts of the target more or less. A local variation in the illumination intensity can alternatively be realized by making the transmission of the light distributor locally different.

In a preferred embodiment, the light conductor is shaped as a fork which preferably comprises two prongs. The handle of this fork faces the light source and the prongs terminate in the said radiation space.

The light distributor preferably consists of a frosted light-transmitting ring or a ring of a diffusely transparent material which is fit between the two sleeves.

Some preferred embodiments according to the invention will be described in detail hereinafter with reference to the drawing.

Figure 2:
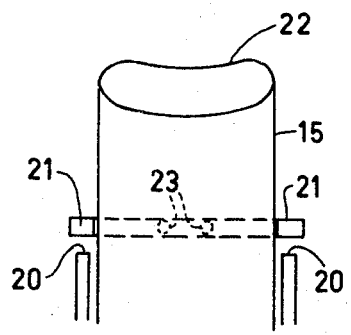
Figure 3:
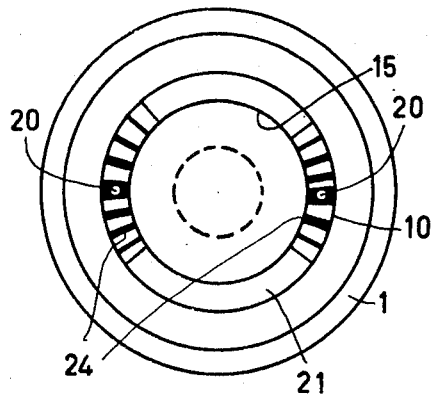

FIG. 1 is a diagrammatic sectional view of a camera tube according to the invention, FIG. 2 is a diagrammatic view of a preferred embodiment of an auxiliary cylinder according to the invention, and FIG. 3 is a sectional view taken along the line III—III of the television camera tube shown in FIG. 1.

As is shown in FIG. 1, a television camera of the Vidicon type comprises a glass envelope 1 in which an entrance window 2 and a tube base 3 comprising passage pins 4 and an exhaust stem 5 are accommodated. On the inner side, the window 2 is provided with a target 6 which comprises a transparent signal electrode 7 and a photo-sensitive layer 8. The photo-sensitive layer preferably consists of lead monoxide, but may also be composed of another photo-conductor. A gauze electrode 9 is mounted in the tube at a comparatively small distance from the target. This gauge electrode can be provided on one end of an anode sleeve 10, but may alternatively be electrically isolated therefrom. On an end of the anode sleeve 10 which is remote from the target an electron gun 11 is arranged. This electron gun comprises a cathode 12, a control grid 13 and preferably also one or a few control anodes 14. An auxiliary cylinder 15 is mounted at least partly coaxially in the anode sleeve 10. At least the part of the cylinder 15 which projects into the anode sleeve has a diameter such that an annular space 16 exists between this cylinder and the anode sleeve. In this embodiment a light conductor 17 is shaped as a fork, a handle portion 18 of which is directed towards the pump stem, and which comprises two prongs 19 having openings 20 which open into the space 16. In the space 16 there is provided a light distributor 21 which in this case has the shape of a flat ring and which seals the space 16 between the openings 20 of the light conductor and the target. The light distributor 21 is preferably mounted at a distance of a few millimeters from the openings 20, but may also contact these openings or may even form one assembly with the light conductor. The light conductor can also be funnel shaped, a ring shaped opening of which being directed into the space 16. In this embodiment the light distributor can the more be part of the lightpipe and thus being omitted as separate element. The auxiliary cylinder 15 clearly projects beyond the light distributor into the anode sleeve, so that half-shadow regions appear on the target when the light distributor is irradiated. The distance between the boundary of the light distributor which is remote from the light conductor and the boundary of the auxiliary cylinder which faces the target is so large in a preferred embodiment that a central portion of the target forms part of this half-shadow region. A boundary 22 of the auxiliary cylinder 15 can be adapted to a desired light distribution on the target empirically as well as by calculation. For example, the auxiliary cylinder can be given a length such that the centre of the target is just not directly irradiated by the light distributor. Given areas of the target can be given more or less preference by profiling the boundary 22 or by providing openings 23 in the cylinder wall. A preferred embodiment of an auxiliary cylinder which comprises a corrugated boundary 22 and openings 23 is shown in FIG. 2. The profiling of the boundary 22 of the auxiliary cylinder 15 or the provision of openings in the cylinder wall thereof can be readily performed in that only a thin-walled metal sleeve is involved. The auxiliary cylinder does not perform an active function in the electron-optical system of the pick-up lense, so that it cannot introduce errors therein. The auxiliary cylinder is made diffusely reflective preferably on the inner side as well as on the outer side so as to avoid the occurrence of given preferred orientations and hence additionally illuminated target portions. In practical embodiments, the anode sleeve as well as the auxiliary cylinder has a circular section, but this is not necessary for proper operation according to the invention.

Besides a wide adjusting range for the light distribution on the target by adaptation of the auxiliary cylinder, a plurality of adjustments can be realized by local adaptation of the light transmission of the light distributor. For example, as is shown in FIG. 3, the portions which are situated opposite the openings 20 of the light conductor can be blackened more or less on the side facing the target. To this end, a pattern of blackened strips 24 or a continuously or step-wise varying blackening can be provided on the light distributor. The light distributor preferably consists of frosted, transparent material, but can also be made of diffusely transparent material. It is advantageous to arrange the light distributor at a few milimeters from the openings 20 and to seal the space 16 in a reflective manner on the side facing the tube base, with the exception of openings for the prongs 19, by way of a closure 25 between the anode sleeve 10 and the auxiliary cylinder 15. In a further preferred embodiment, the openings 20 contact the light distributor and are cemented thereto, for example, by means of cement having an adapted refractive index. A slight inhomogeneity can occur in the light distribution across the target in a camera tube as described in that too much light is incident at the edge of the target. In a preferred embodiment, the anode sleeve 10 is provided with a widened portion 27 near the target, so that this relative over-illumination is avoided. In a further preferred embodiment yet according to the invention, no widened portion is provided in the anode sleeve, but the last part thereof which faces the target is made less reflective on the inner side.

A light source 30 is mounted against the base 3 of the camera tube. A portion 28 of the exhaust stem 5 can be formed such that it acts as a lens for the light emitted by the light source. In order to determine the wavelength range of the light 26 to be used, a filter 29 can be mounted between the light source and the entrance 18 of the light conductor. In order to restrict the loss of light, and hence to restrict the occurrence of undesired stray light in the camera tube, a part of the light conductor can be provided with a reflective layer 31, for example, a metal layer. The light conductor can consist of a glass rod, but also of a monofibre or a bundle of fibres. The light source can be accommodated in a housing 32 which is reflective on the inner side, and in a preferred embodiment the light source is cemented to the camera tube by means of cement. Light losses can again be restricted by using a cement having a suitable refractive index. The exchanging of the light source, if necessary, can be readily performed in this preferred embodiment by removing the cement. The camera tube itself will not be damaged during such an operation.

In a further preferred embodiment, the cylindrical part of the lampholder has no bottom and is glued on the exhaust stem preferably together with the filter. The lamp 30 is encapsulated in for instance a plastic material such that it can easily be replaced in the cylinder.

What is claimed is:

1. A television camera tube having, in an evacuated envelope, a photosensitive target, an electron gun assembly, an anode sleeve extending between the target and the gun assembly, and means for the auxiliary illumination of the target, said auxiliary illuminating means comprising a light source, a hollow light shielding cylinder located within said anode sleeve to define an annular space between its outer wall and an inner wall portion of said sleeve, an annular light distributor disposed within said annular space at such a distance from the end of the shielding cylinder facing said target as to produce a non-uniform illumination of said target, and means for conducting light from said light source to the distributor in the annular space section remote from said target.

2. A television camera tube as claimed in claim 1, wherein the light distributor consists of a ring of a transparent material which is at least partly frosted.

3. A television camera tube as claimed in claim 1, wherein the light distributor consists of a diffusely transparent material.

4. A television camera tube as claimed in claim 1, wherein the light conductor comprises at least two prongs which project into the space between the anode sleeve and the auxiliary cylinder and which are symmetrically distributed over the circumference of the said space.

5. A television camera tube as claimed in claim 4, wherein the light conductor is shaped as a fork, a handle portion of which is directed towards the light source which is centrally situated in the tube base.

6. A television camera tube as claimed in claim 1, wherein the light distributor comprises regions of different transmission at least on a side facing the target.

7. A television camera tube as claimed in claim 1, wherein the shielding cylinder has a profiled boundary on the side facing the target.

8. A television camera tube as claimed in claim 1, wherein the shielding cylinder comprises openings which are situated near the light distributor.

9. A television camera tube as claimed in claim 1, wherein the anode sleeve comprises a widened portion of the side facing the target.

10. A television camera tube as claimed in claim 1, wherein the light conductor comprises two openings which are diametrically situated in the annular space.

11. A television camera tube as claimed in claim 1, wherein the light source is externally mounted on the tube base.

12. A television camera tube as claimed in claim 1, wherein the light source is connected to the camera tube by means of a transparent cement.

* * * * *